C. R. FOUNTAIN.
COMBINED STOVE AND FIRELESS COOKER.
APPLICATION FILED JAN. 4, 1916.
1,190,993.
Patented July 11, 1916.
2 SHEETS—SHEET 1.
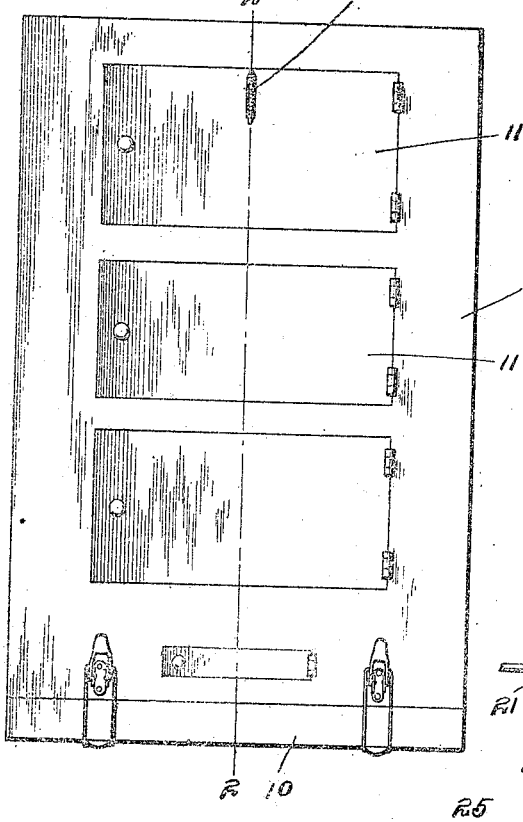
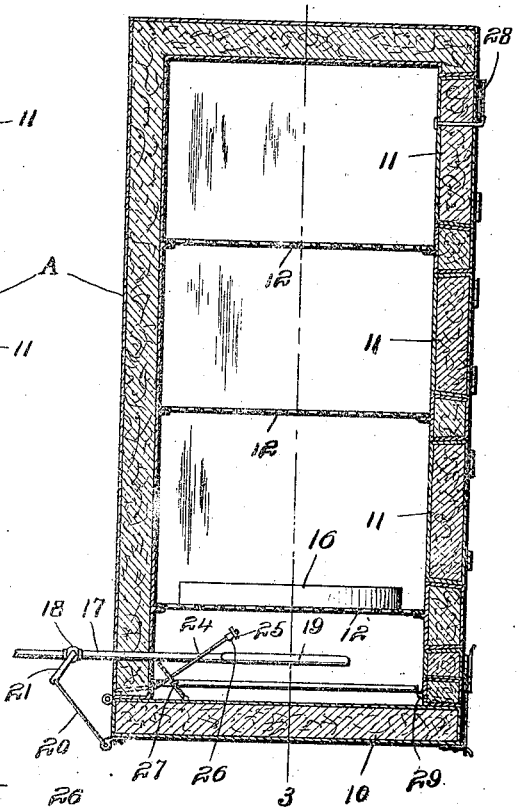
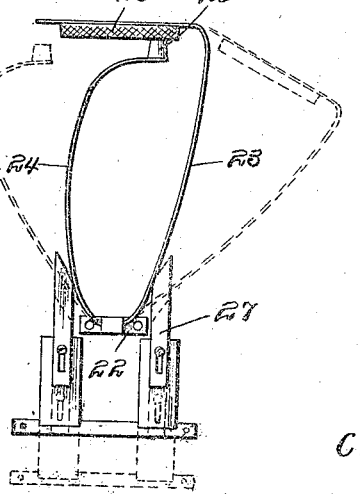
Witnesses
Inventor
C. R. Fountain
By Victor J. Evans
Attorney

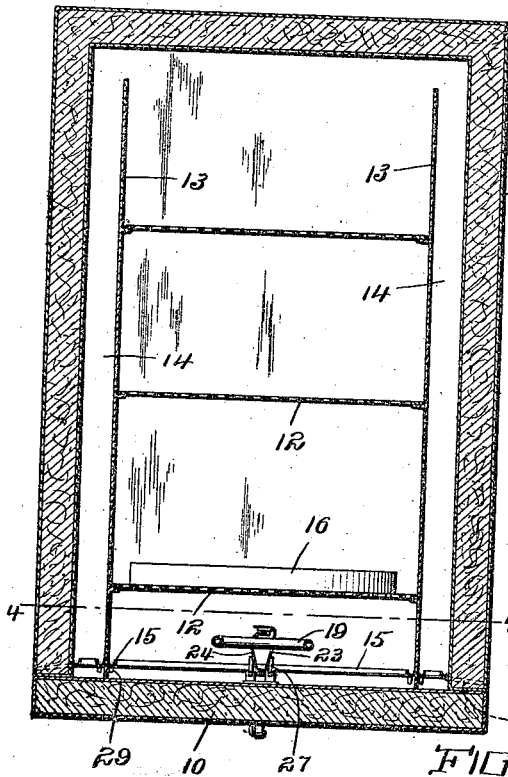

UNITED STATES PATENT OFFICE.

CLAUDE R. FOUNTAIN, OF ATHENS, GEORGIA.

COMBINED STOVE AND FIRELESS COOKER.

1,190,993.  Specification of Letters Patent.  Patented July 11, 1916.

Application filed January 4, 1916. Serial No. 70,279.

*To all whom it may concern:*

Be it known that I, CLAUDE R. FOUNTAIN, a citizen of the United States, residing at Athens, in the county of Clarke and State of Georgia, have invented new and useful Improvements in Combined Stoves and Fireless Cookers, of which the following is a specification.

The invention relates to a combined stove and fireless cooker.

The primary object of the invention is the provision of a combination stove and fireless cooker of this character wherein access is had to the interior thereof through the side of the body to the respective heating compartments therein, thereby enabling independent communication with each compartment so as to avoid the escape of heat from the upper compartments when access is had to any of the lower ones.

Another object of the invention is the provision of a combined stove and cooker of this character wherein maximum heat is utilized for heating the substances to be cooked in the respective compartments, the walls of the cooker and the heating unit with as little loss of heat as possible.

A further object of the invention is the provision of a combined stove and fireless cooker of this character wherein the burner is controlled by a door at the bottom of the same which also actuates an igniter or sparking device so that on the opening of the said door the fuel will be turned on and the same lighted at the burner and upon the closing of this door the fuel will be shut off, thereby avoiding the waste of fuel and the heat after the cooker has become thoroughly heated.

A still further object of the invention is the provision of a combined stove and cooker of this character wherein the heat is conducted through the superposed compartments thereof and exhausted from the bottom of said stove or cooker.

A still further object of the invention is the provision of a combination stove and cooker of this character wherein the heat is directed therein in such a manner so that the same will be given up directly to the substances to be cooked.

A still further object of the invention is the provision of a combination stove and cooker of this character which is extremely simple in construction, thoroughly reliable and efficient in its purpose and inexpensive in manufacture.

Other objects will be in part obvious and in part hereinafter pointed out.

The invention accordingly consists in the features of construction, combination of elements and arrangement of parts which will be exemplified in the construction hereinafter set forth, and the scope of the application of which will be indicated in the claim hereunto appended.

In the accompanying drawings: Figure 1 is a front elevation of a combined stove and fireless cooker constructed in accordance with the invention; Fig. 2 is a vertical sectional view on the line 2—2 of Fig. 1; Fig. 3 is a sectional view on the line 3—3 of Fig. 2; Fig. 4 is a sectional view on the line 4—4 of Fig. 3; Fig. 5 is a front elevation of the sparking device or igniter, showing by full lines the position thereof when the bottom door of the stove or cooker is closed and by dotted lines its position when the door is open; Fig. 6 is a fragmentary vertical sectional view showing by dotted lines the door closed and by full lines the door open for controlling the fuel supply to the burner.

Similar characters of reference denote corresponding parts throughout the several views of the drawings.

Referring to the drawings in detail, the combined stove and fireless cooker comprises a box-like body A, the walls of which are suitably insulated or made from insulated material, and at the bottom of the body is hinged a swinging door 10, while provided at the front of the body are a plurality of swinging doors 11 which permit access to be had to the interior of the said body A which has arranged therein superposed reticulated shelves 12 dividing the said body into independent compartments, and access may be had to either of the compartments on the opening of its door.

Formed interiorly of the body A and spaced from the end walls thereof are vertical partitions 13 which, at their upper ends, terminate spaced from the top of the said body A, while the lower ends terminate in a plane with the open bottom of the said body, and these partitions form hot air flues 14 substantially the length of the body for the exhaust of hot air therefrom on the opening of the bottom door 10, the said flues at their lower ends being closed when the door is shut.

Formed on the partitions 13 at the inner and outer faces thereof and also formed on the inner faces of the ends and side walls of the body 11 near their lower ends are gutters 15 which serve to catch the condensation during the steaming of food stuffs within the body.

Removably placed upon the lowermost shelf 12 is a heating unit or slab 16 preferably made from soapstone, and this unit or slab is heated in a manner presently described.

Passed through the rear wall of the body 11 and extended into the lowermost compartment within said body beneath the unit or slab 16 is a fuel supply pipe 17 which is provided without the body with a cut-off valve 18, and mounted upon this pipe 17 interiorly of the body is a burner 19 which, when ignited, serves to heat the unit or slab 16 and the compartments formed by the shelves 12 interiorly of the body. Pivotally connected to the hinged edge of the bottom door 10 is a link 20 which is also pivotally connected to a crank 21 mounted on the plug of the valve 18, the said valve being normally closed when the door is shut and upon the opening thereof the valve is automatically opened for the turning on of the fuel to the burner 19, the latter being ignited in a manner presently described.

Arranged within the lowermost compartment in the body A is a sparking device which comprises a bracket 22 suitably fixed to the inner face of the rear wall of the body A, the bracket being formed with resilient arms 23 and 24 respectively, the arm 23 being constructed to support a serrated block 25, while the arm 24 is constructed to support a sparking element 26 which is adapted to engage the block 25 for producing a spark on the movement of the arms 23 and 24 away from each other.

Mounted upon the bottom door 10 is an adjustable yoke 27, the arms of which act upon the arms 23 and 24 to contract or move the same toward each other upon the closing of the said door 10 and on the opening of this door the resiliency of the arms 23 and 24 will effect the spreading thereof, which will draw the sparking element 26 over the serrated face of the block 25, thereby producing a spark for the ignition of the fuel at the burner 19, which fuel is permitted to flow thereto when the door 10 is opened by the link 20 actuating the valve to open the same. On the closing of the door 10 the fuel is cut off from the burner 19 by the closing of the valve 18 in the pipe 17, thereby shutting off the products of combustion within the combined stove and cooker from the burner.

It will be apparent that the combined stove and cooker can be used for cooking purposes, the heating unit or slab 16 being designed to retain the heat when the burner is not lighted after the closing of the bottom door 10. This heating unit or slab 16 can be readily removed from the body A so that on the lighting of the burner food substances placed within the said body A can be baked and the apparatus used as an ordinary stove. It will be apparent that it is impossible to turn on the fuel without igniting the same at the burner. When the burner is ignited heat is generated within the body A for cooking purposes and by the use of the heating unit or slab 16 the apparatus can be utilized as a fireless cooker. The heating unit or slab 16 not only serves to store heat but also prevents the substances placed within the lowermost compartment becoming heated prior to the heating of the substances placed in the superposed compartment. When desired, a suitable receptacle containing water can be placed within the body A instead of the heating unit or slab 16 for steaming purposes. Also, if desired, another receptacle containing water can be placed on the shelves for the respective compartments within the body A. The products of combustion pass upwardly through the respective compartments within the body A and thence downwardly through the flues 14 formed between the partitions 13 on the end walls of the body A and will be discharged from the said flues through the open bottom when the bottom door 10 is open. The heating unit or slab 16 can be placed within the lower compartment in the body A when cold and the burner, when lighted, will serve to heat the same as well as the walls of the said body A and the substances placed therein to be cooked. By reason of the fact that the products of combustion pass upwardly through the heating compartment the heat therein, that is to say, the larger part thereof, will be given up to the substances for the cooking thereof, while the walls which absorb a portion of the heat also serve to radiate such heat for the cooking of the substances within the compartments in the body A of the apparatus.

It is of course understood that in lieu of the burner 19 any other heater may be substituted.

Mounted exteriorly on the body A near the top thereof is a suitable thermometer 28 which enables a person to ascertain the temperature or the degree of heat interiorly of the apparatus.

The condensation is drained from the gutters through suitable outlet tubes or drain conduits 29 leading therefrom to the exterior of the body of the apparatus.

From the foregoing description, taken in connection with the accompanying drawings, the construction and manner of use of the invention will be readily apparent and a more extended explanation has, therefore, been omitted.

Having thus described my invention, I claim:

A combined stove and fireless cooker comprising an insulated body having doors at its bottom and one side, reticulated shelves within said body for forming compartments, means interiorly of the body for conducting heat downwardly from the top thereof after passing upwardly through the compartments, a heater located within the body near the bottom thereof, means for controlling the fuel supply to the heater and actuated by the bottom door, means for igniting the heater and operated by said bottom door, and gutters located interiorly of the body at the bottom thereof and having outlet drain conduits leading therefrom exteriorly of the body.

In testimony whereof I affix my signature in presence of two witnesses.

CLAUDE R. FOUNTAIN.

Witnesses:
P. T. BETTS,
EARL FROMBROUGH.